United States Patent
Cirio (10) Patent No.: US 8,439,413 B2
(45) Date of Patent: May 14, 2013

(54) GRIPPING DEVICE FOR AUTOMATIC BOTTLE-TOPPING MACHINES

(75) Inventor: Sergio Cirio, Canelli (IT)

(73) Assignee: Arol S.p.A., Canelli (Asti) (IT)

( * ) Notice: Subject to any disclaimer, the term of this patent is extended or adjusted under 35 U.S.C. 154(b) by 161 days.

(21) Appl. No.: 13/016,799

(22) Filed: Jan. 28, 2011

(65) Prior Publication Data

US 2011/0266818 A1 Nov. 3, 2011

(30) Foreign Application Priority Data

Apr. 30, 2010 (IT) ............... TO2010A0367

(51) Int. Cl.
*B25J 15/02* (2006.01)
*B66C 1/00* (2006.01)
(52) U.S. Cl.
USPC ............. 294/116; 198/803.7; 198/803.9; 53/331.5; 53/367
(58) Field of Classification Search .......... 294/106, 294/116, 110.1; 198/803.7, 803.9; 53/317, 53/331.5, 367
See application file for complete search history.

(56) References Cited

U.S. PATENT DOCUMENTS 3,948,552 A * 4/1976 Hamrick ............... 294/115
4,709,803 A * 12/1987 Swiderski ............ 198/468.2
5,253,910 A * 10/1993 Perrier ................ 294/116
5,575,379 A * 11/1996 Schmetzer ............ 198/803.9
6,079,541 A * 6/2000 Bercelli et al. ........ 198/377.03
7,264,113 B2 * 9/2007 Hartness et al. ........... 198/850
2007/0261369 A1 11/2007 Takahara et al.
2007/0267882 A1 11/2007 Takahara et al.

FOREIGN PATENT DOCUMENTS

| EP | 1712496 A1 | 10/2006 |
|---|---|---|
| FR | 2774666 A1 | 8/1999 |
| WO | 03078285 A1 | 9/2003 |

OTHER PUBLICATIONS

Search report for Italian patent application No. TO2010A000367 dated Dec. 6, 2010.

* cited by examiner

*Primary Examiner* — Dean Kramer
*Assistant Examiner* — Stephen Vu
(74) *Attorney, Agent, or Firm* — Patterson & Sheridan, L.L.P.

(57) ABSTRACT

A gripping device for automatic bottle-topping machines comprising an anti-rotation blocking element, mobile between an opening position and a gripping position, a first mechanism, provided for actuation of the anti-rotation blocking element, a first actuation element, operatively connected to the first mechanism a gripping element, mobile between an opening position and a gripping position, a second mechanism, provided for actuation of the gripping element, and a second actuation element, operatively connected to the second mechanism, wherein the anti-rotation blocking element and the gripping element are provided for engaging on a bottle.

17 Claims, 7 Drawing Sheets

GRIPPING DEVICE FOR AUTOMATIC BOTTLE-TOPPING MACHINES

CROSS-REFERENCE TO RELATED APPLICATIONS

This application claims priority to Italian patent application number TO2010A000367, filed Apr. 30, 2010, and is herein incorporated by reference.

BACKGROUND OF THE INVENTION

1. Field of the Invention

The present invention relates to gripping devices for automatic bottle-topping machines. More precisely, the present invention regards a gripping device designed for installation on a carousel of an automatic bottle-topping machine and designed to withhold a bottle.

2. Description of the Related Art

Automatic bottle-topping machines have, in general, a carousel structure comprising a plurality of different devices, each designed to perform a particular function. Amongst said devices, for example, are topping devices and gripping devices.

Figures 1, 1A:
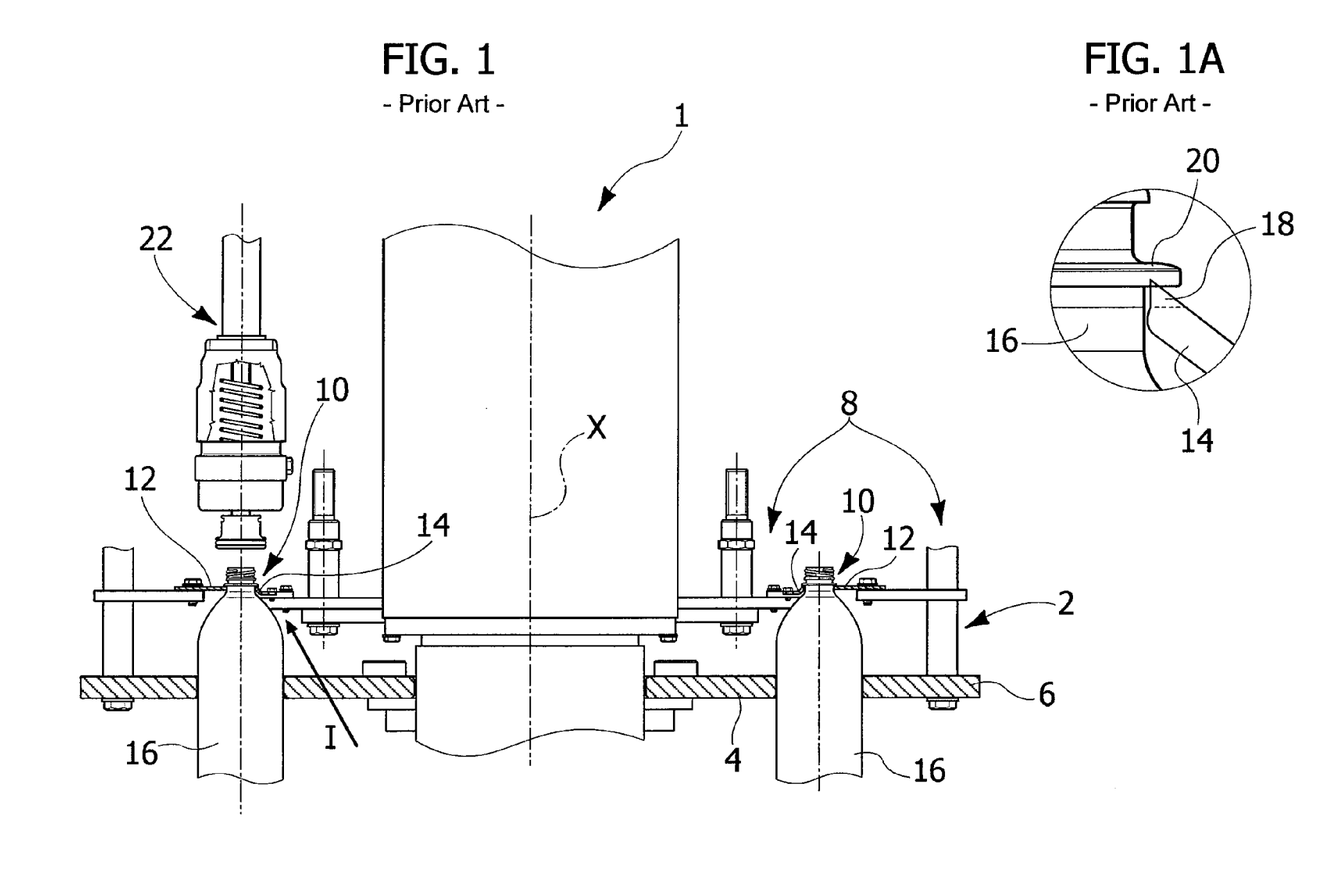
FIG. 1, described previously, illustrates an automatic bottle-topping machine of a known type.
FIG. 1A is a view according to the arrow I of FIG. 1.

Designated by 1 in FIG. 1 is an automatic bottle-topping machine of a known type. The machine 1 has a vertical axis X about which a plurality of carousels turn, said machine comprising a bottle-holder carousel designated by 2 in FIG. 1. The bottle-holder carousel 2 comprises a central star 4, an external guide element 6, and a gripping structure 8.

The gripping structure 8 comprises a plurality of gripping devices 10. Each gripping device 10 comprises an external guide element 12 and an internal centring and blocking element 14.

A plurality of bottles 16 is carried by the bottle-holder carousel 2 so that the body of the bottles is set in compartments created by the central star 4 and by the external guide element 6, whilst the neck of the bottles is set between the blocking element 14 and the guide element 12.

With reference to FIG. 1a, which illustrates at an enlarged scale a detail indicated by an arrow I in FIG. 1, each centring and blocking element 14 has a bent lip with a toothed edge 18, which is designed to penetrate in a lip 20 of each bottle 16. The machine 1 further comprises a plurality of topping devices 22, particularly of the type with screwing head, positioned so as to be coaxial to a corresponding bottle 16 carried by the bottle-holder carousel 2.

During operation of the machine 1, the bottle-holder carousel 2 turns about the axis X and draws the bottles 16 in rotation. The topping devices 22 turn together with the machine 1 and do not vary their relative position with respect to the corresponding bottles 16.

Each topping device 22 descends towards the corresponding bottle 16 and screws a threaded top or cap on the neck thereof. In order to keep the bottle 16 fixed in rotation during screwing, the toothed edge 18 penetrates within the lip 20 following upon a vertical load, directed parallel to the axis X, applied on the bottles 16 by the corresponding topping devices 22.

The above process, however, exerts a stress on the thread present in the top, as well as on the lip 20 of the bottle and moreover, since the gripping devices 10 are not able to ensure, by themselves, positioning of the bottle, imposes the need to use the central star 4 and the external guide element 6. Whenever it is necessary to process bottles of different formats it becomes necessary to replace the parts 4 and 6, which increases the number of central stars and external guide elements necessary for proper operation of the machine 1 and moreover creates delays in the production chain due to the times for tooling the machine 1.

The object of the present invention is to overcome the problems of the known art. In particular, the object of the present invention is to provide a gripping device that is able to block rotation of a bottle without exerting a stress on the lip and is able to eliminate the problems linked to the use of the central star and of the external guide element for guiding each bottle.

SUMMARY OF THE INVENTION

The object of the invention is achieved by a gripping device having the characteristics forming the subject of the annexed claims, which form an integral part of the technical teaching provided herein in relation to the invention.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 2:
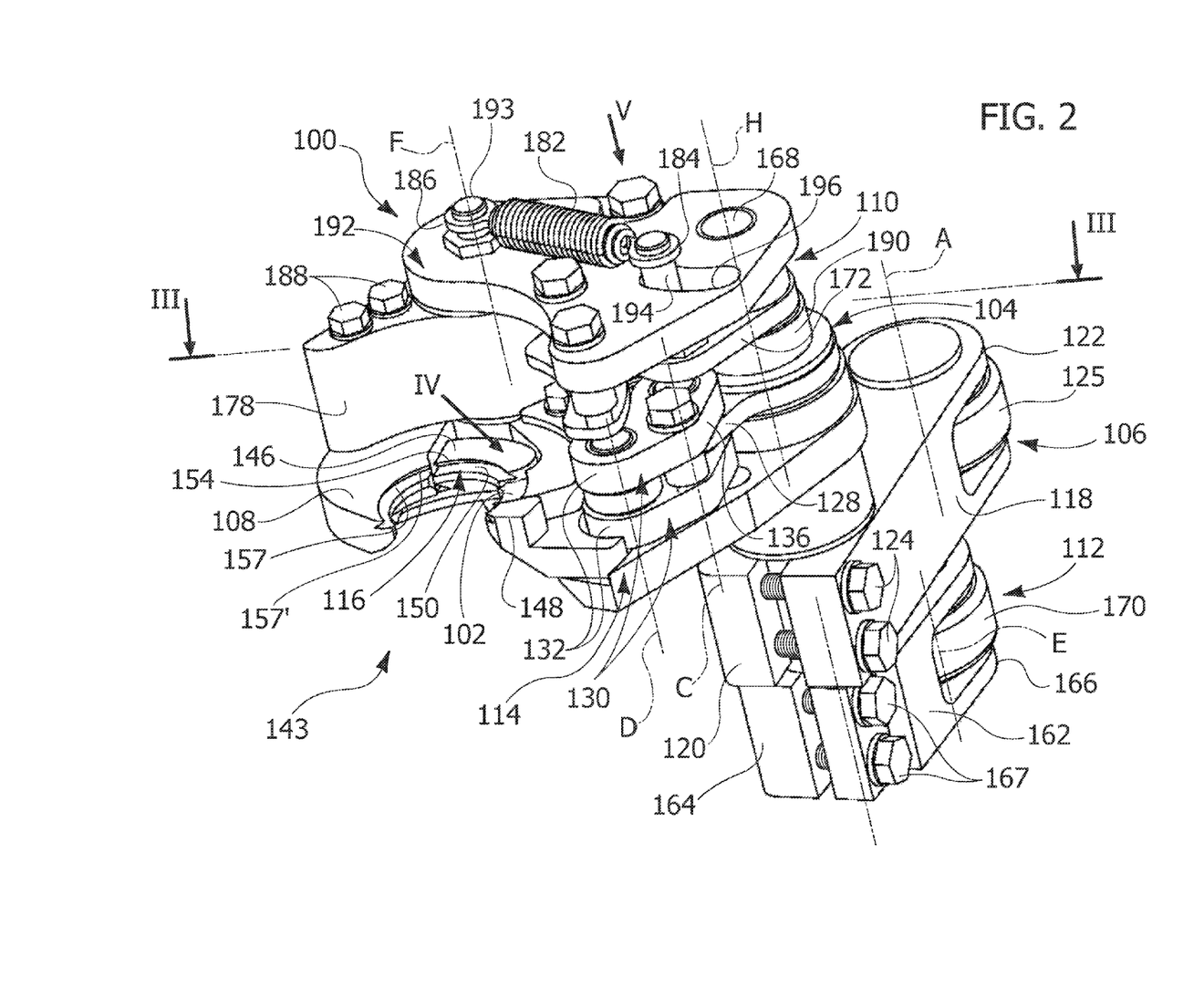
FIG. 2 is a perspective view of a gripping device according to the present invention.

Designated by 100 in FIG. 2 is a gripping device for bottles according to the present invention. The device 100 comprises an anti-rotation blocking element 102 (in what follows, for reasons of brevity, referred to as "blocking element") having a pair of teeth 103, a first mechanism 104 provided for actuation of the blocking element 102, a first actuation element 106 operatively connected to the first mechanism 104, a gripping element 108, a second mechanism 110 provided for actuation of the gripping element 108, and a second actuation element 112 operatively connected to the second mechanism 110. The device 100 further comprises a main axis of articulation H, a supporting plate 114, which supports the components described previously, and a fixed centring element 116, which is also carried by the plate 114.

With reference to FIGS. 2 and 3, the first actuation element 106 comprises a lever 118 that can turn about the axis H and has a first forked end 120 and a second forked end 122. The first forked end 120 is secured, by means of screws 124, on a first pin 126 sharing the axis H and having a hollow cylindrical cross section. In this way, the pin 126 is rigidly connected in rotation to the lever 118. At the second forked end 122, a roller 124 is mounted so that it can turn about an axis A parallel to the axis H.

With reference to FIGS. 2 and 3, the first mechanism 104 comprises a first rocker 128, which can turn about the axis H and is rigidly connected in rotation to the pin 126, a first connecting rod 130, articulated, at a first end 132 of its own to the rocker 128, and a second rocker 134, which is articulated to a second end 136 of the connecting rod 130 and is able to turn about an axis B parallel to the axis H. The first mechanism 104 further comprises a first elastic element 138 having a first end 140 connected to the first rocker 128 and a second end 142 connected to the supporting plate 114, which supports the second rocker 134.

The connecting rod 130 is articulated to the first rocker 128 about an axis C parallel to the axis H and is articulated to the second rocker 134 about an axis D parallel to the axis H. The axes C and D are mobile with respect to the supporting plate 114, whilst the axes H and B are fixed with respect to the plate 114. The first end 140 of the elastic element 138 is mobile with respect to the supporting plate 114, whilst the second end 142 is fixed with respect to the plate 114, and this consequently reflects upon the points of connection of the elastic element 138 to the first rocker 128 and to the plate 114, respectively.

The blocking element 102 is moreover rigidly connected to the second rocker 134 and turns therewith about the axis B. The blocking element 102 is moreover free to slide within the centring element 116.

Figure 4:
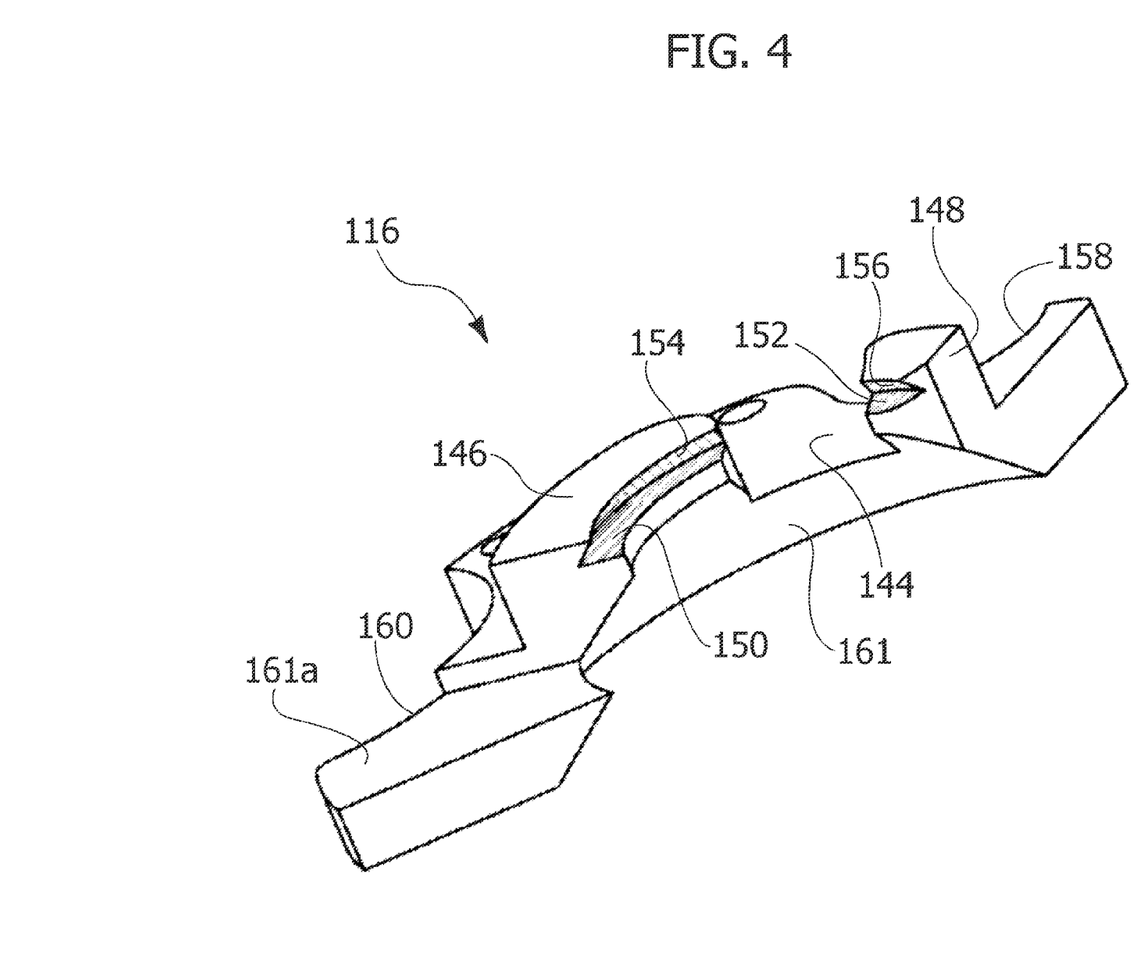
FIG. 4 is a perspective view of a component of the gripping device according to the arrow IV of FIG. 2.

With reference in particular to FIG. 4, the centring element 116 is substantially C-shaped and is designed to co-operate with the elements 102, 108, defining with these a gripping area having variable geometry 143.

The element 116 comprises a first surface 144, with respect to which two supporting projections 146, 148 with curvilinear development protrude. Each supporting projection is shaped in such a way as to comprise a respective supporting surface 150, 152 and a respective conical shoulder 154, 156. A similar structure comprising a supporting surface 157 and a conical shoulder 157' is present on the gripping element 108. The latter is preferably hook-shaped.

Provided at the opposite ends of the element 116 are recesses 158, 160 having cylindrical walls, whilst present at the supporting projections 146, 148 is a recess with conical wall 161. A second surface 161a is moreover provided alongside the projection 146 on a side opposite to the first surface 144.

The blocking element 102 is positioned between the two projections 146, 148, parallel to the surface 144.

The first recess with a cylindrical wall 158 receives the connecting rod 130. The latter (see FIG. 2) is preferably made with a pair of identical biscuit-like elements.

With reference to FIGS. 2 and 5, the second actuation element 112 comprises a lever 162, which has a length smaller than the lever 118, is able to turn about the axis H, and has a first forked end 164 and a second forked end 166.

Figures 3A, 3B:
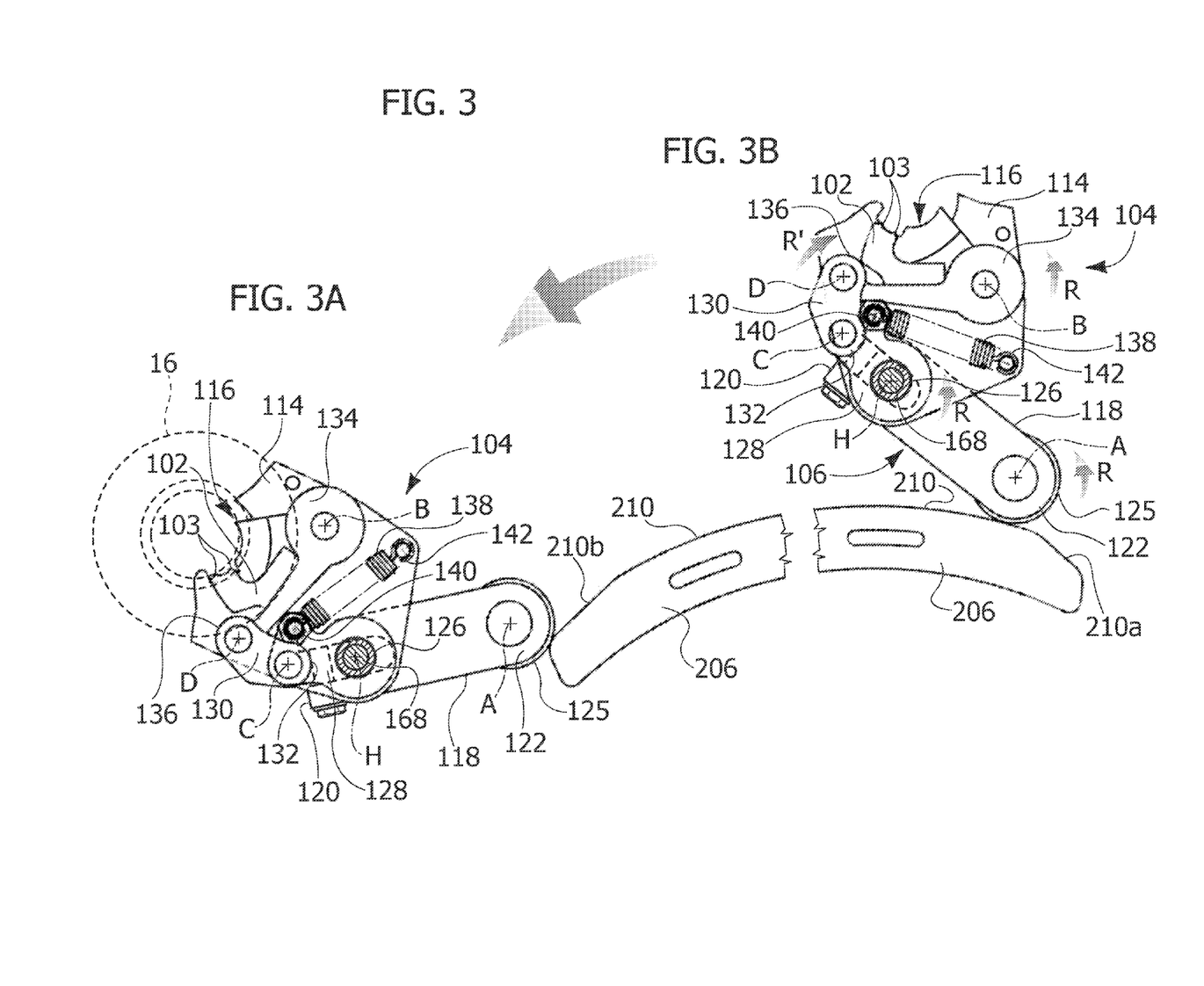
FIG. 3 is a cross-sectional view according to the trace III-III of FIG. 2 and consists of FIG. 3A and FIG. 3B, which illustrate an operating sequence of the device according to the present invention.

The first forked end 164 is secured, by means of screws 167, on a second pin 168 sharing the axis H. The pin 168 is in this way rigidly connected in rotation to the lever 162 and extends through the entire device 100, being moreover inserted within the first pin 126 (FIGS. 3A, 3B). The pins 126, 168 are able to turn independently of one another since no means is provided for inhibiting their relative rotation.

Mounted on the second forked end 166 is a roller 170 that can turn about an axis E parallel to the axis H.

The second mechanism 110 comprises a third rocker 172, which can turn about the axis H and is rigidly connected in rotation to the pin 168, a second connecting rod 174, articulated, at a first end 176 of its own, to the third rocker 172, and a fourth rocker 178, which can turn about an axis F parallel to the axis H and is articulated to the connecting rod 174 at a second end 180 of the latter. The second mechanism 110 further comprises a second elastic element 182 having a first end 184 connected to the third rocker 172, and a second end 186 connected to the fourth rocker 178.

In greater detail, the third rocker 172 and the connecting rod 174 are articulated with respect to an axis G parallel to the axis H, whilst the fourth rocker 178 and the connecting rod 174 are articulated with respect to an axis I, which is also parallel to the axis H. With reference, in particular, to FIG. 5, the axis F is fixed with respect to the supporting plate 114, whilst the axes G and I have a position variable with respect to the supporting plate 114. It should moreover be noted that the gripping element 108 is rigidly fixed to the rocker 178 by means of screws 188 and is thus itself able to turn about the axis F.

With reference to FIG. 2, the second mechanism 110 surmounts the first mechanism 104, from which it is separated by means of a spacer 190 along the axis H and is in turn surmounted by a closing plate 192. The plate 192 is fitted on the pin 168 and on a pin 193 sharing the axis F, about which the fourth rocker 178 can turn and connected to which is the second end 186 of the elastic element 182. A further pin 194 is rigidly connected to the third rocker 172 and traverses the plate 192 in a position corresponding to a curvilinear groove 196. The shape of the groove 196 is such as to enable the motion of the pin 194 about the axis H. Furthermore, the fourth rocker 178 has a development, along the axis H, such that it rests on the supporting plate 114. The recess 160 is shaped to accommodate the rocker 178. The gripping element 108 is supported by the pin 193 in rotation about the axis F.

Figures 5A, 5B:
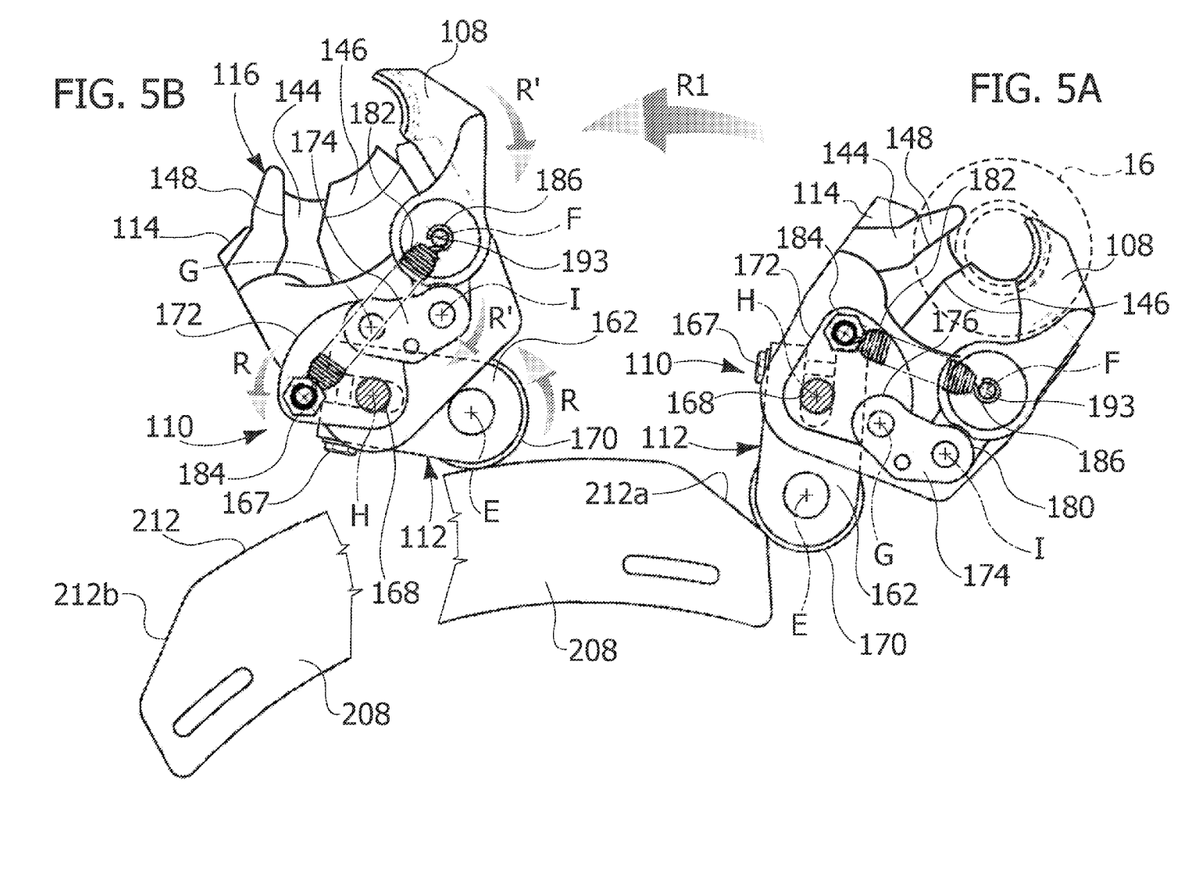
FIG. 5 has a structure similar to that of FIG. 3 but shows a view according to the arrow V of FIG. 2 with some components removed for reasons of clarity.

Operation of the device 100 is described in what follows. With reference to FIGS. 3 and 5, each mechanism 104, 110 is mobile between a resting position (FIGS. 3A, 5A) and a working position (FIGS. 3B, 5B). The resting position of each of the mechanisms 104, 110 corresponds to a gripping position for both of the elements 102, 108. The respective working positions of the mechanisms 104, 110 correspond, instead, to positions of opening of the elements 102, 108. The aforesaid blocking and gripping elements 102, 108 co-operate with the centring element 116 for gripping and keeping a bottle 16 fixed in rotation with respect to them. Consequently, the terms "opening position" and "gripping position" evidently refer to the interaction between the device 100 and the bottle 16.

Figure 7:
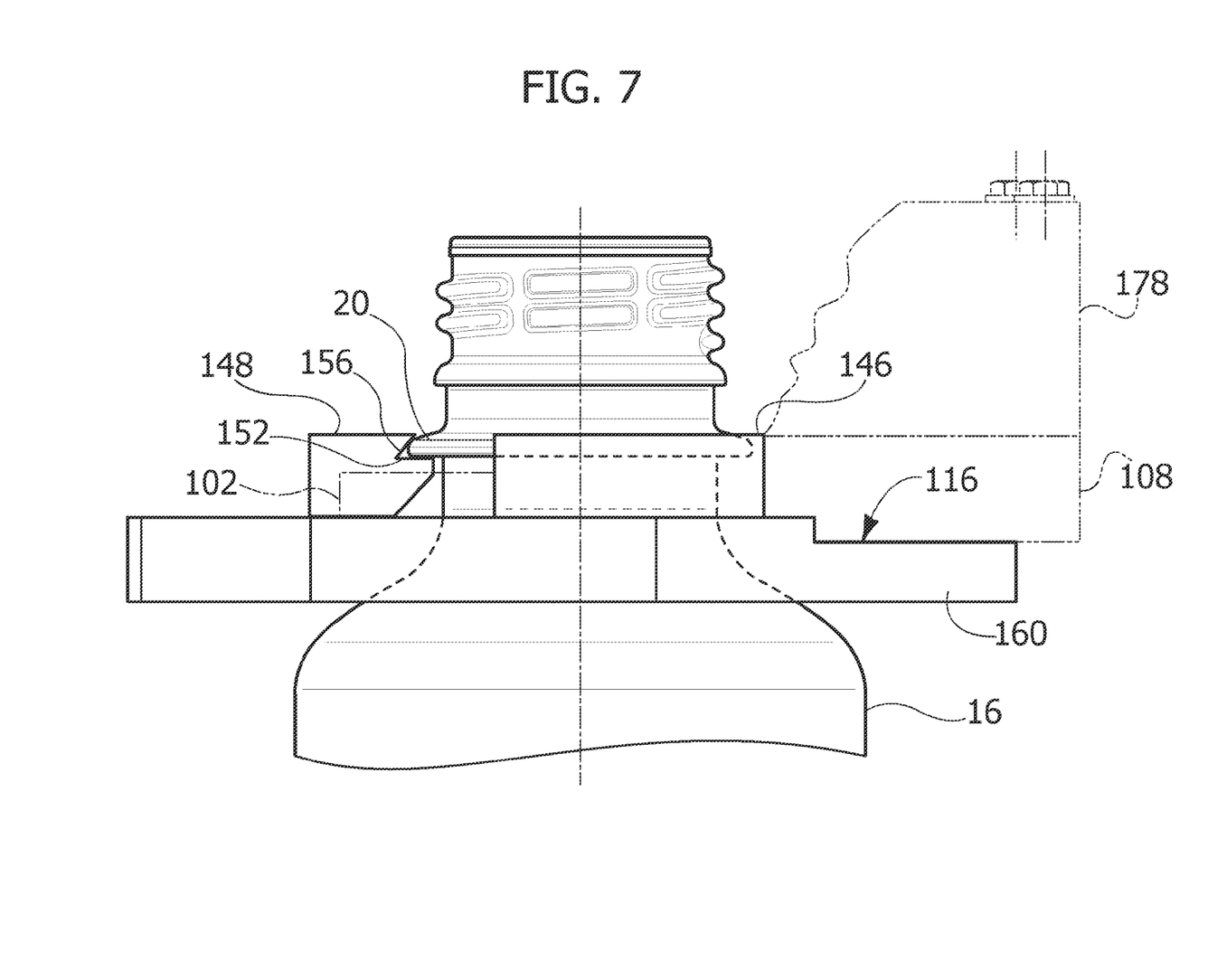
FIG. 7 is a view according to the arrow VII of FIG. 6 with some components removed for reasons of clarity.

In particular (FIGS. 3A, 5A), in the gripping position the gripping element 108 is set alongside the projection 146 of the centring element 116 so that the shoulder 157' and the surface 157 substantially form a continuation of the shoulder 154 and of the surface 150, whilst the blocking element 102 is positioned between the projections 146 and 148 so that the teeth 103 project within the recess with conical wall 161. With reference to FIG. 7, the lip 20 of the bottle 16 is withheld axially by the surfaces 150, 152, 157 and radially by the shoulders 154, 156, 157'. The rotation of the bottle 16 is moreover blocked by the teeth 103 that are gripping the neck of the bottle.

With reference to FIGS. 2, 3 and 5, each of the mechanisms 106, 110 is acuatable by means of rotation of the respective actuation elements 106, 112, particularly of the levers 118, 162. The angular staggering of the levers 118, 162 is zero when the mechanisms 104, 110 are in a resting position. Since said levers are rigidly connected in rotation, one to the pin 126 and one to the pin 168, they govern rotation of the first rocker 128 and of the third rocker 172. The latter two rockers, thanks to the respective kinematic chains, govern the blocking element 102 and the gripping element 108, respectively.

With reference to FIG. 3, the passage from the resting position to the working position of the first mechanism 104 is obtained by impressing on the lever 118 a rotation in the direction R illustrated in FIG. 3b. It should moreover be noted that in this representation the direction R is counterclockwise. Rotation in the direction R of the lever 118 causes an equal rotation, once again in the direction R, of the first rocker 128. This in turn causes a rotation in a direction R', opposite to the direction R, of the connecting rod 130 and a further consequent rotation in the direction R of the second rocker 134. At the same time, the elastic element 138 is set in tension on account of the recession of the end 140 from the end 142.

Rotation in the direction R of the rocker 134 causes a retraction in a substantially radial direction of the blocking element 102 with respect to the walls of the conical recess 161 of the centring element 116. In this way, the teeth 161b do not project within the recess with conical wall 161 and are not able to exert any action on the neck of the bottle 16.

The sizing of the kinematic chain comprising the first and second rockers 128, 134 and the connecting rod 130 is preferably made by selecting lever ratios such that a force impressed on the first rocker 128 is amplified in the transmission to the second rocker 134. This aspect is important since it enables the value of stiffness of the elastic element 138 to be kept low. In fact, the elastic element 138 exerts on the rocker 128 an action of elastic return that causes return of the mechanism 104 into a resting position and consequently blocks the element 102 in the gripping position. Thanks to the amplification of force described above, a force of modest degree exerted by the elastic element 138 is sufficient to transmit to the blocking element 102 a force of greater degree that contributes to maintaining the gripping position.

Likewise, passage from the resting position to the working position of the second mechanism 110 is obtained by impressing a rotation in the direction R on the lever 162. It should moreover be noted that this does not imply in any way that the amplitude of rotation of the levers 162 and 118 is the same. The amplitude of rotation depends only upon the modalities of actuation, which will be described hereinafter.

Rotation of the lever 162 causes an equal rotation, once again in the direction R (here represented as counterclockwise), of the third rocker 172. This causes a consequent rotation of the connecting rod 174 in the direction R', here represented as clockwise, and finally a rotation once again in the direction R' discordant with respect to the direction R, of the fourth rocker 178, which causes a recession of the gripping element 108 from the supporting projection 146 of the centring element 116 and from the lip 20 of the bottle 16.

At the same time, on account of the rotation of the third rocker 172 and as occurs for the mechanism 104, the elastic element 182 is set in tension on account of the recession of the first end 184 from the second end 186.

Like the mechanism 104, the mechanism 110 can return into the resting position thanks to an elastic action provided by the elastic element 182.

Furthermore, the sizing of the kinematic chain between the third rocker 172 and the fourth rocker 178, in particular the choice of the relative position of the axes F, G, H, I, is made so that the mechanism 110 is substantially of an irreversible type, i.e., acuatable only by means of one or more very precise elements of the kinematic chain, but not by just any element.

This means that it is possible to actuate the mechanism 110 only via the lever 162 and/or the third rocker 172 (actuation by the rocker 172 alone is evidently obtained by the elastic element 182 as the mechanism 110 is brought back into a resting position), hence inhibiting the possibility of actuation via the gripping element 108, which finally renders impossible accidental disengagement of the bottle 16.

Since the pins 126, 168 are coaxial and are able to turn independently of one another, the actuation of each mechanism 104, 110 is altogether independent and it is possible to have four combinations of the positions of the aforesaid mechanisms, which thus generate four operating configurations of the gripping device 100.

However, as will emerge clearly from the ensuing description, of these four configurations only three are used, namely:

receiving configuration, in which the elements 102, 108 are in an open position, and the respective mechanisms 104, 110 are in the working position;

configuration of partial blocking, in which the mechanism 110 is in the resting position and the mechanism 104 is in the working position, hence where the gripping element 108 is in the gripping position whilst the blocking element 102 is in the open position; and configuration of total blocking, in which both of the mechanisms 104, 110 are in the resting position, and consequently both of the elements 102, 108 are in the gripping position.

Figure 6:
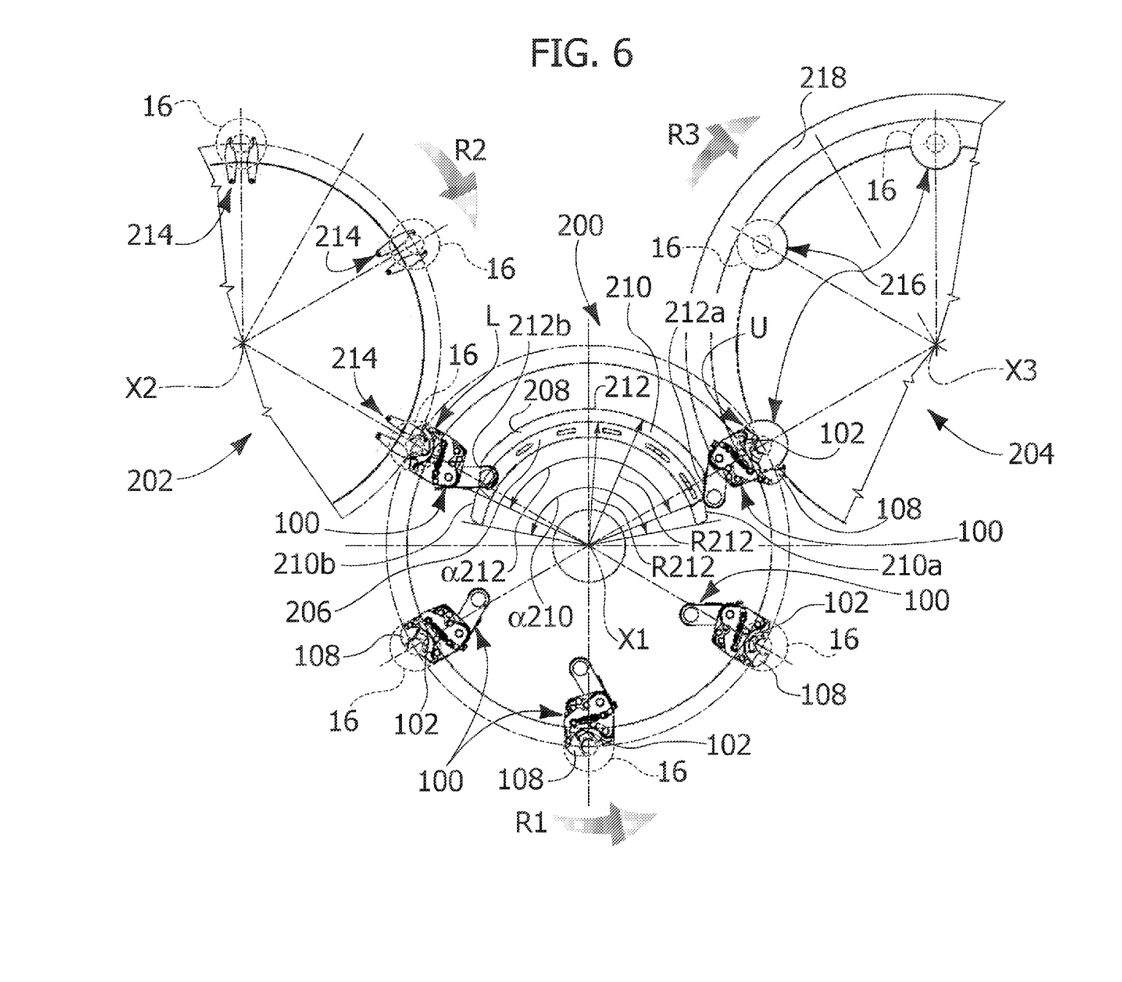
FIG. 6 is a top plan view of a processing line comprising a bottle-topping machine on which the gripping device according to the present invention is installed.

With reference to FIG. 6, a plurality of gripping devices 100 is installed on a bottle-topping machine 200 having a carousel structure. The machine 200, here represented schematically, co-operates with a loading carousel 202 and an unloading carousel 204.

The machine 200 is as a whole able to turn about an axis X1, whilst the carousels 202, 204 are able to turn about respective axes X2, X3 parallel to one another and to the axis X1.

The machine 200 (FIG. 6 and FIGS. 3, 5) comprises a first cam 206 and a second cam 208 provided for actuation, respectively, of the first mechanism 104 and of the second mechanism 110. Each cam 206, 208 has a circular development and comprises a respective path 210, 212 provided for sliding of the rollers 125, 170. The path 210 has a radius r210 smaller than the radius r212 of the path 212, but has an angular extension α210 greater than the angular extension α212 of the path 212. Each path 210, 212 comprises, at opposite ends, respective ascending ramps 210a, 212a and descending ramps 210b, 212b. Their functional characterization evidently depends upon the direction of rotation of the machine 200.

The gripping devices 100 are mounted on the machine 200 in positions set at the same angular distances apart. The gripping devices 100 are able to turn with the machine 200 about the axis X1 whilst the cams 208, 206 are fixed in rotation.

The loading carousel 202 comprises a plurality of gripping assemblies 214, each designed to carry a bottle 16.

The unloading carousel 204 comprises a plurality of recesses 216, each designed to withhold a respective bottle 16, and a plate 218, which carries the bottles 16. The unloading carousel 204 is able to turn about an axis X3 parallel to the axis X1.

The machine 200, the loading carousel 202, and the unloading carousel 204 define a processing line for the bottles 16.

During operation, the machine 200 and the carousels 202, 204 turn about the respective axes X1, X2, X3. In particular, the carousels 202 and 204 define with the machine 200 a pair of points of interaction.

In particular, the carousel 202 defines a bottle-loading point L when a gripping device 100 and a gripping assembly 214 occupy a common position, whilst the carousel 204 likewise defines a bottle-unloading point U in the point in which a recess 216 and a gripping device 100 are located in a common position.

Operation of the processing line illustrated above is described in what follows.

The machine 200 turns about the axis X1 in a direction R1, here represented as being counterclockwise. The carousels 202 and 204 turn in directions, respectively, R2 and R3 concordant to one another and opposite to the direction R1. The speeds of rotation are such that at each turn the points in which each gripping device shares a common position with a gripping assembly 214 and with a recess 216 have always the same absolute spatial positions, illustrated in FIG. 6. Hence, the points L and U have fixed positions with respect to the machine 200.

Considering a gripping device 100 in rotation about the axis X1 in the direction R1, when this is located in an angular interval comprised between the two ramps 212a, 212b, both of the mechanisms 104, 110 are in the working position since the cams 206, 208 carry out actuation thereof by impressing a rotation on the levers 118, 162. Consequently, the blocking element 102 and the gripping element 108 are in the respective opening positions.

In the bottle-loading position L, the bottle 16 passes from a gripping assembly 214 to the gripping device 100. The lip 20 rests on the surfaces 150, 152, whilst the oblique shoulders 154, 156 withhold it in position.

At the same time, the position of the device 100 with respect to the cams 206, 208 is such that the device occupies a position corresponding to the descending ramp 212b, which is shaped so as to release gradually part of the action on the lever 162, thus causing a progressive closing of the gripping element 108 on the lip 20.

The device 100, however, is not yet in a position corresponding to the descending ramp 210b; consequently, the blocking element 102 is still in the open position.

Proceeding then with the rotation in the direction R1, the roller 125 traverses the descending ramp 210b, causing a gradual release of the action on the lever 118, and the consequent displacement into a position of closing of the blocking element 102, which terminates when the device 100 has passed beyond the corresponding end cam 206.

As described, thanks to the teeth 103, the element 102 exerts a gripping action on the neck of the bottle 16, thus preventing rotation thereof with respect to the gripping device 100.

Hence, the cams 206, 208, immediately downstream of the point L, carry out sequential closing of the gripping element 108 and of the blocking element 102.

In the remaining part of the rotation, the bottle is carried by the fixed centring element 116 and is blocked in rotation by the blocking element 102, thus enabling screwing of the top by the device 22 without any possibility of the bottle turning thus annulling the screwing action.

As the bottle-unloading point U is approached thanks to the ascending ramps 210a, 212a, the cams 206, 208 carry out a sequential opening of the blocking element 102 and of the gripping element 108.

In particular, considering the direction R1, the device 100 encounters first the cam 206 and the ascending ramp 210a, which operate the lever 118 causing rotation thereof in the direction R and causing opening of the blocking element 102, and then, proceeding further towards the bottle-unloading point U, the device 100 encounters the cam 208 and the ascending ramp 212a, which causes actuation of the lever 162 and consequent opening of the gripping element 108.

In this way, when the device 100 is located in the bottle-unloading point U, the unloading carousel 204 can pick up the bottle 16, without there being any interference with the gripping device 100.

The same sequence of operations is repeated at periodic intervals for each device 100, and can be summarized as follows:

in the area comprised between the ramps 212a and 212b each device 100 is located in a receiving position;

in the area comprised between the ramps 212b and 210b and between the ramps 210a and 212a, each device 100 is in a condition of partial blocking, where only the gripping element 108 is in the gripping position; and in any further position, each device 100 is in a condition of total blocking, where the blocking element 102 and the gripping element 108 are in the gripping position.

The advantages in the use of the gripping device 100 are multiple. In particular, the centring element 116 exerts a dual function of supporting the bottle with the surfaces 150 and 152 and of withholding it via the oblique shoulders 154, 156, which enables elimination of the central star 4 and the external guide element 6. Furthermore, the element 116 does not need to be adapted to bottles of different size.

Nevertheless, the action of the anti-rotation blocking element 102 is exerted on the neck of the bottle 16, and neither the lip 20 or the thread undergoes any stress or strain, as occurs in devices of a known type.

The characteristics of irreversibility of the mechanism 110, described previously, ensure maximum safety in regard to accidental disengagement of the bottles 16 and consequently increases the reliability of the machine 200.

Furthermore, the amplification of force provided by the mechanism 104 involves only modest forces of actuation, which correspond to low values of load on the roller 125. The same applies to the mechanism 110, in which the irreversibility renders superfluous any recourse to an elastic element 182 with high stiffness (which would require high forces of actuation on the lever 162) for maintaining the closed position, which, instead, is maintained thanks to the irreversibility of the mechanism. The elastic element 182 thus functions as mere means of elastic return, as does the elastic element 138.

It is thus possible to use plastic and metal materials not subject to oxidation for building the device, which enables installation of the devices 100 in a washable area of the machine 200, hence facilitating considerably the corresponding cleaning operations.

Of course, the details of construction and the embodiments may vary widely with respect to what has been described and illustrated herein, without thereby departing from the sphere of protection of the present invention, as defined by the annexed claims.

The invention claimed is:

1. A gripping device for bottles for automatic bottle-topping machines, comprising:
   an anti-rotation blocking element, mobile between an opening position and a gripping position;
   a main axis of articulation;
   a first mechanism, provided for actuation of said anti-rotation blocking element, wherein said first mechanism comprises a first rocker that can turn about said main axis of articulation, a first connecting rod articulated, at a first end thereof to said first rocker and a second rocker articulated to a second end of said first connecting rod, said second rocker being rigidly connected to said anti-rotation blocking element and being able to turn about an axis parallel to said main axis of articulation, said first mechanism moreover having lever ratios that determine an amplification of a force transmitted from said first rocker to said second rocker;

a first actuation element, operatively connected to said first mechanism;

a gripping element, mobile between an opening position and a gripping position;

a second mechanism, provided for actuation of said gripping element; and a second actuation element, operatively connected to said second mechanism;

wherein said anti-rotation blocking element and said gripping element are provided for engaging on a bottle.

2. The gripping device according to claim 1, wherein said first mechanism further comprises a first elastic element having a first end connected to said first rocker and a second end connected to a supporting plate, said first rocker moreover being rigidly connected in rotation to a first pin sharing said main axis of articulation.

3. The gripping device according to claim 2, wherein said first actuation element comprises a lever, which can turn about said main axis of articulation and has a first forked end and a second forked end, wherein said first forked end is fastened on said first pin and wherein, at said second forked end, a roller is mounted so that it can turn about an axis parallel to said main axis of articulation.

4. The gripping device according to claim 1, wherein said second mechanism comprises a third rocker that can turn about said main axis of articulation, a second connecting rod articulated, at a first end thereof to said third rocker, a fourth rocker, which is articulated to a second end thereof to said second connecting rod and is able to turn about an axis parallel to said main axis of articulation, said fourth rocker being rigidly connected to said gripping element, said second mechanism being acuatable only by means of said second actuation element or said third rocker.

5. The gripping device according to claim 4, wherein said second mechanism further comprises a second elastic element having a first end connected to said third rocker and a second end connected to said fourth rocker, said third rocker moreover being rigidly connected in rotation to a second pin sharing said main axis of articulation.

6. The gripping device according to claim 5, wherein said second actuation element comprises a lever that can turn about said main axis of articulation and has a first forked end and a second forked end, wherein said first forked end is fastened on said second pin, and wherein, at said second forked end, a roller is mounted so that it can turn about an axis parallel to said main axis of articulation.

7. A gripping device for bottles for automatic bottle-topping machines, comprising:

an anti-rotation blocking element, mobile between an opening position and a gripping position;

a first mechanism, provided for actuation of said anti-rotation blocking element;

a first actuation element, operatively connected to said first mechanism;

a gripping element, mobile between an opening position and a gripping position, wherein said anti-rotation blocking element and said gripping element are provided for engaging on a bottle;

a second mechanism, provided for actuation of said gripping element;

a second actuation element, operatively connected to said second mechanism; and a centring element including two supporting projections with curvilinear development, each of said supporting projections comprising a respective supporting surface and a respective conical shoulder, said centring element defining, with said gripping element and anti-rotation blocking element, a gripping area with variable geometry, said gripping element moreover being hook-shaped and said anti-rotation blocking element comprising a pair of teeth.

8. A gripping device for bottles for automatic bottle-topping machines, the gripping device comprising:

an anti-rotation blocking element, mobile between an opening position and a gripping position;

a first mechanism, provided for actuation of said anti-rotation blocking element;

a first actuation element, operatively connected to said first mechanism;

a gripping element, mobile between an opening position and a gripping position;

a second mechanism, provided for actuation of said gripping element; and a second actuation element, operatively connected to said second mechanism;

a centering element configured for cooperating with said anti-rotation blocking element and said gripping element and defining therewith a gripping area having variable geometry, wherein said anti-rotation blocking element and said gripping element are provided for engaging on a bottle, wherein said first mechanism and said second mechanism can be actuated independently, and wherein in the respective gripping position said gripping element is configured to cooperate with said centering element so as to axially and radially hold a bottle within said gripping area having variable geometry.

9. The gripping device according to claim 8, comprising a main axis of articulation.

10. The gripping device according to claim 9, wherein said first mechanism comprises a first rocker that can turn about said main axis of articulation, a first connecting rod articulated, at a first end of its own, to said first rocker and a second rocker articulated to a second end of said first connecting rod, said second rocker being rigidly connected to said anti-rotation blocking element and being able to turn about an axis parallel to said main axis of articulation, said first mechanism moreover having lever ratios that determine an amplification of a force transmitted from said first rocker to said second rocker.

11. The gripping device according to claim 10, wherein said first mechanism further comprises a first elastic element having a first end connected to said first rocker and a second end connected to a supporting plate, said first rocker moreover being rigidly connected in rotation to a first pin sharing said main axis of articulation.

12. The gripping device according to claim 11, wherein said first actuation element comprises a lever, which can turn about said main axis of articulation and has a first forked end and a second forked end, wherein said first forked end is fastened on said first pin and wherein, at said second forked end, a roller is mounted so that it can turn about an axis parallel to said main axis of articulation.

13. The gripping device according to claim 9, wherein said second mechanism comprises a third rocker that can turn about said main axis of articulation, a second connecting rod articulated, at a first end of its own, to said third rocker, a fourth rocker, which is articulated to a second end of its own of said second connecting rod and is able to turn about an axis parallel to said main axis of articulation, said fourth rocker being rigidly connected to said gripping element, said second mechanism being acuatable only by means of said second actuation element or said third rocker.

14. The gripping device according to claim 13, wherein said second mechanism further comprises a second elastic element having a first end connected to said third rocker and a second end connected to said fourth rocker, said third rocker moreover being rigidly connected in rotation to a second pin sharing said main axis of articulation.

15. The gripping device according to claim 14, wherein said second actuation element comprises a lever that can turn about said main axis of articulation and has a first forked end and a second forked end, wherein said first forked end is fastened on said second pin, and wherein, at said second forked end, a roller is mounted so that it can turn about an axis parallel to said main axis of articulation.

16. The gripping device according to claim 8, wherein said centering element is substantially C-shaped and includes a first and a second supporting projections with curvilinear development, each of said supporting projections comprising a respective supporting surface and a respective conical shoulder, wherein a similar structure including a supporting surface and a conical shoulder is provided on the gripping element.

17. The gripping device according to claim 16, wherein in the respective gripping position the gripping element is set alongside the first supporting projection of said centering element so that the conical shoulder and the supporting surface of the gripping element substantially form a continuation of the conical shoulder and the supporting surface of said first supporting projection.

* * * * *